Dec. 14, 1971     A. AMIRIKIAN     3,626,653
BISERRATED FRAMING MEMBER
Filed Nov. 18, 1969     10 Sheets-Sheet 1

Arshavir Amirikian
INVENTOR

INVENTOR

Dec. 14, 1971 A. AMIRIKIAN 3,626,653
BISERRATED FRAMING MEMBER
Filed Nov. 18, 1969 10 Sheets-Sheet 7

INVENTOR

Dec. 14, 1971  A. AMIRIKIAN  3,626,653
BISERRATED FRAMING MEMBER
Filed Nov. 18, 1969  10 Sheets-Sheet 9

INVENTOR
Arshaw Amirikian

United States Patent Office 3,626,653
Patented Dec. 14, 1971

3,626,653
BISERRATED FRAMING MEMBER
Arsham Amirikian, 6526 Western Ave.,
Chevy Chase, Md. 20015
Filed Nov. 18, 1969, Ser. No. 877,610
Int. Cl. E04c 3/30
U.S. Cl. 52—734                    1 Claim

ABSTRACT OF THE DISCLOSURE

The method of increasing the depth of a rolled I-or channel beam, by first cutting the web on a single sinuous or serrated line then welding together the two resulting segments at their projecting edges, is a well-known and practiced art in fabrication. In this invention that principle is extended to a more profitable application in the form of serrating a strip of plate along both of its two longitudinal boundaries. When a strip is double cut from a large plate, by serrated cutting, the width of a straight-cut strip is increased by an amount equal to the depth of the serration, which gain is obtained without an increase in weight. Another feature of the strip is that the serrations consist of directly opposite and mutually parallel pairs of edge segments in the two sides, thus providing a constant cross-sectional area for the strip throughout its length. A doubly-serrated strip of this type, when used either in flat or bent form, serves as the basic element for building a number of new framing members of great structural efficiency and economic merit.

---

The invention relates to a structural element, to the method of its formation, and the manner of utilization to compose framing members.

The main object of the invention is to provide an economical framing member by a more efficient use of construction materials than is obtainable in present-day fabrication practice.

A secondary object of the invention is to provide a framing member of distinct aesthetic appeal, without an appreciable increase in its cost.

Figure 1:
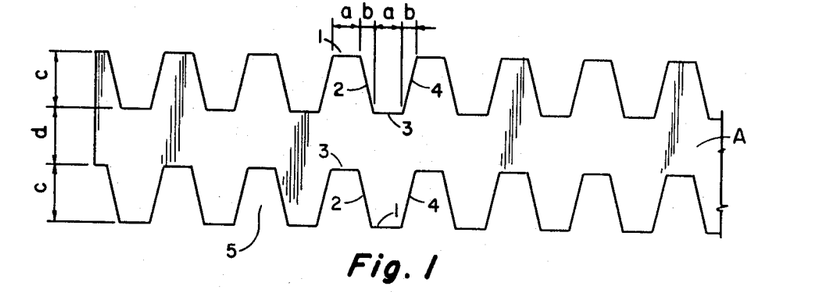
Figure 2:
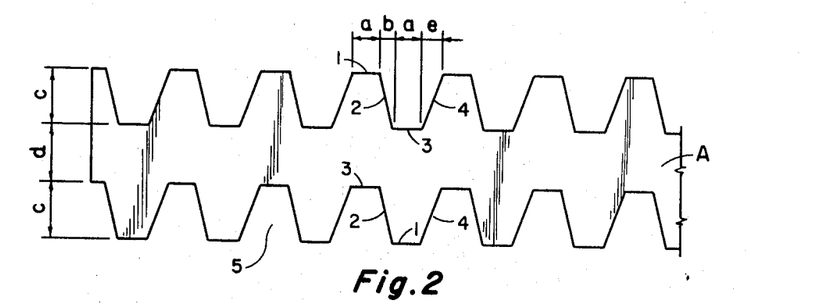
Figure 3:
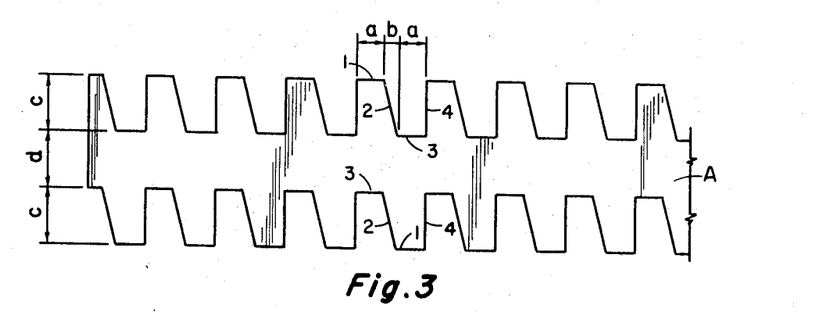
Figure 4:
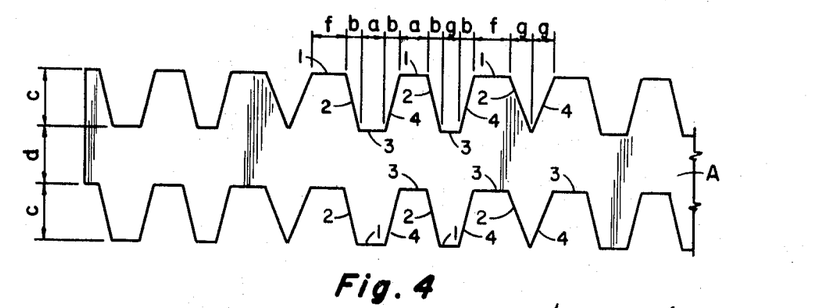

Other advantages inherent in the many novel features of the invention will become apparent by the following detailed description of the invention when considered in conjunction with the accompanying drawings wherein:

FIG. 1 is a diagrammatic view of the basic element, outlining its characteristic longitudinal boundaries. The two sides have paralleling serrated edges, composed of outer segments 1 parallel to the longitudinal axis of the element and inner segments 3 of the same length and direction, joined together with inclined segments 2 and 4. In this most general form, the two sides have identical serrations, and the reversely inclined edge segments 2 and 4 have the same slope and the straight edge segments 1 and 3 are of the same length. Also, the serration dimensions $a$, $b$ and $c$ remain constant for all the serrations of the element. For design purposes, this is the most favorable pattern. However, in certain applications, the dimension $b$ may differ for the edges 2 and 4, thus resulting in differing slopes for the said inclined edges, as shown in FIG. 2, where the horizontal projection of edge 2 is $b$ and that of edge 4 is $e$. In other applications, one or both of the sloping edges 2 and 4 may become normal to the longitudinal axis of the element, as sketched in FIG. 3. Still in other applications, the serrations may conform to a mixed pattern, as shown partially in FIG. 4. From the figures it is also evident that, regardless of the serration pattern used, the distances between the two side edges measured normal to the longitudinal axis, and as indicated by the dimension $c+d$ ($c$ being the depth of the serration and $d$ the width of solid or unserrated part of the element), remain constant throughout the length of the element. This is an important characteristic of the element which will be brought out in the later discussion of its use.

Figure 5:
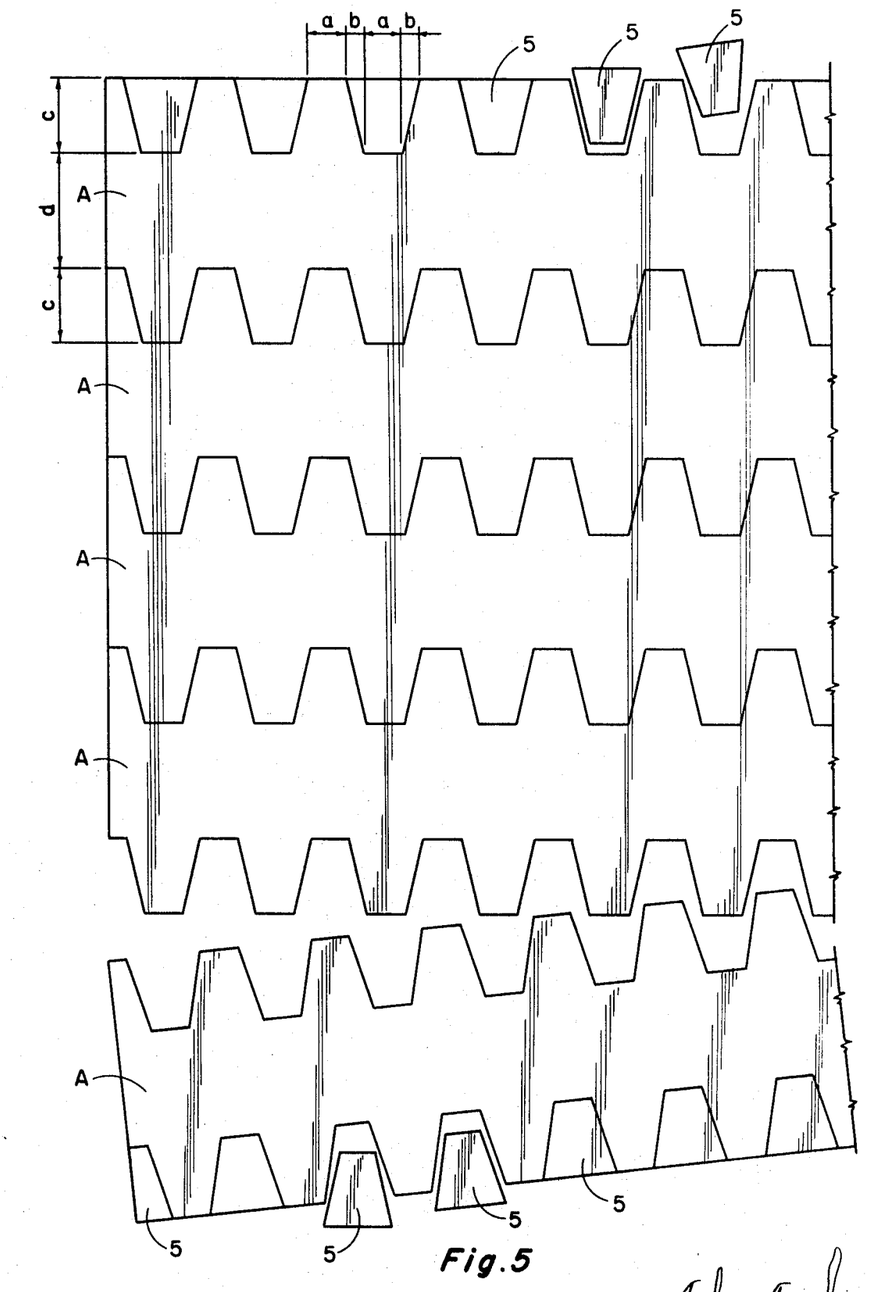

The element may be constituted of metal, plastics, plywood, concrete or of other building materials. In the case of the former three, multiples of the element are obtained from a large plate by cutting it along paralleling serrations, as shown in FIG. 5. By this method of formation, which could be readily and economically achieved through the use of many available mechanized cutting devices, very little waste of material will occur. For example, in the case illustrated in FIG. 5, the only wastage resulting from cutting the rectangular plate into 5 elements A is confined to serration blocks 5 at the top and bottom of the plate. If the element is made of concrete, it will generally be obtained by casting it in molds having conforming side forms.

The main object of serration is to increase the effective width of the element and thus enhance its flexural resistance. While this principle is already known in one application where the member is serrated along one of its two sides, the use of members having serrations on both sides constitutes a new and more advantageous innovation.

Figure 6:
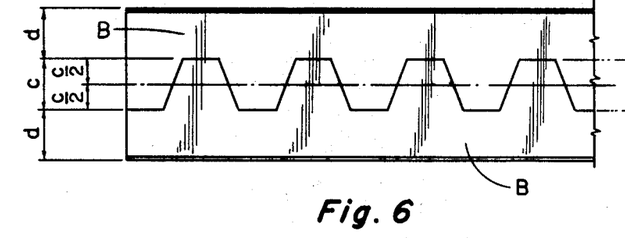
Figure 6A:
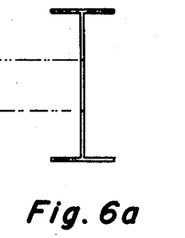

One advantage is that the increase in over-all width of a biserrated element is twice that of one with single serration, in the former equaling the full depth of the serration and only one-half that amount in the latter configuration. This comparison is further illustrated in FIG. 6, where a conventional I-shaped beam, shown in cross-sectional view in FIG. 6a, of a depth $2d+c$, is serrated to provide two T-shaped members, each having an over-all depth $d+c$, and thus representing an increase in depth of one-half $c$ or serration depth for each member.

A second advantage is that the cross-sectional area of a biserrated element conceived in accordance with this invention remains constant throughout the length, whereas in a single serration it will vary from a maximum to a minimum which may not be sufficient in many instances.

Figure 7:
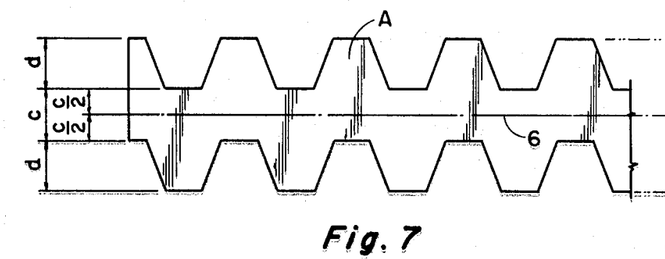
Figure 7A:
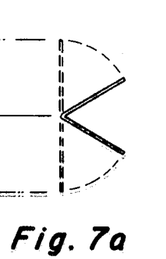
Figure 7B:
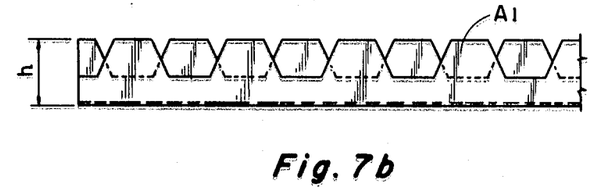
Figure 8:
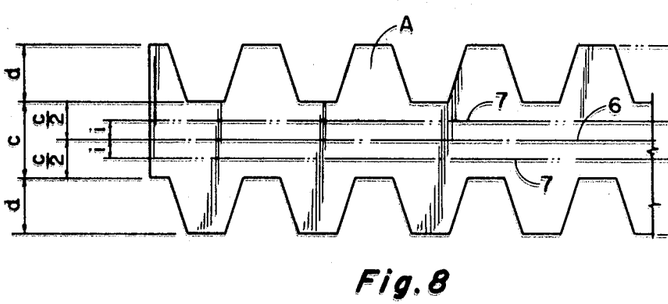
Figure 8A:
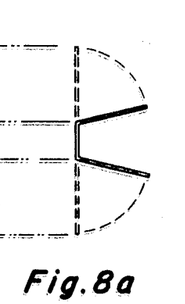
Figure 8B:
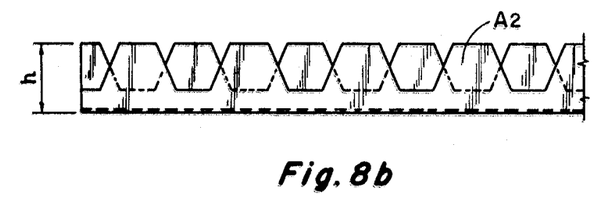

A third advantage is that a biserrated element conforming to this invention when bent along the longitudinal axis, or along two bend lines parallel to the longitudinal axis, would provide two new framing members of great efficiency. To illustrate, the member A in FIG. 7 is bent along its longitudinal axis 6 to form an angle-shaped member A1, of which FIG. 7a, is an end view and FIG. 7b an elevational view. Similarly, the member A in FIG. 8 is bent along two lines 7 parallel to the longitudinal axis 6 to form a channel-shaped member A2, of which FIG. 8a is an end view and FIG. 8b an elevational view.

Figure 9:
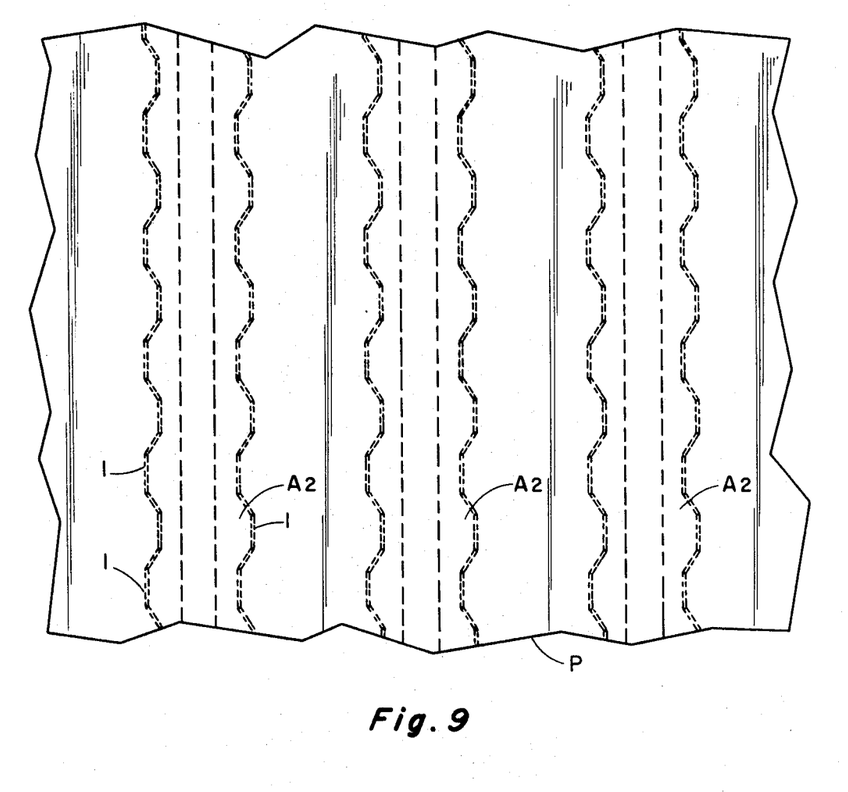
Figure 9A:
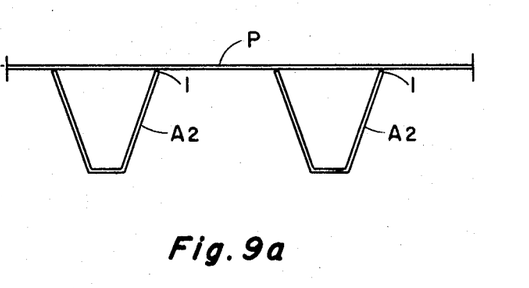
Figure 9B:
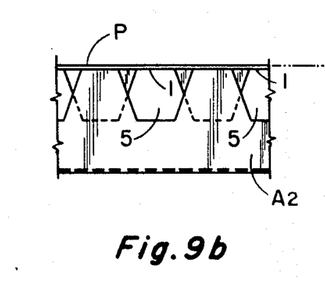
Figure 10:
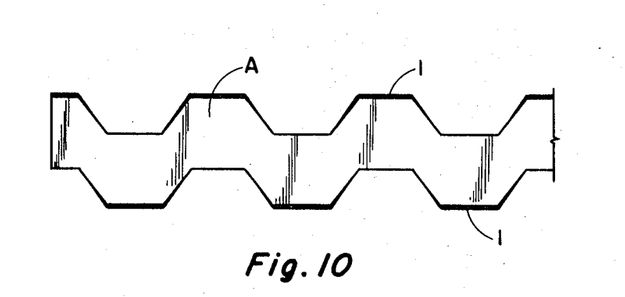
Figure 10A:
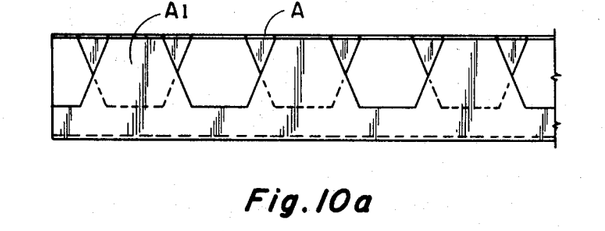
Figure 10B:
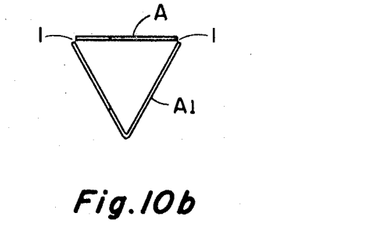
Figure 11:
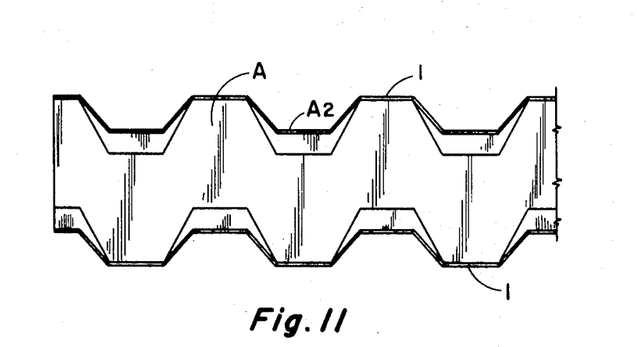
Figure 11A:
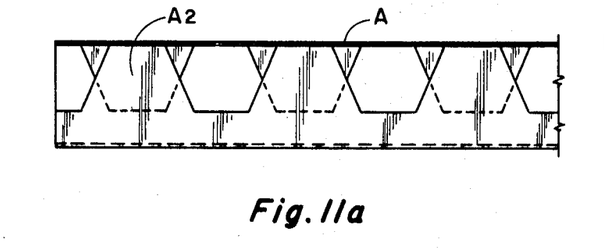
Figure 11B:
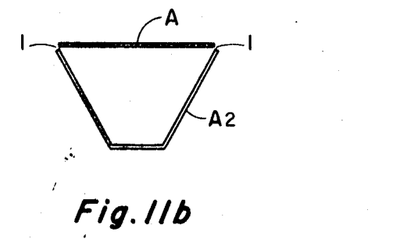

The advantage of these members is further enhanced when used as ribs or stiffeners in welded steel framings, such as the panel shown in plan view FIG. 9, and in cross-sectional view in FIG. 9a. Here the connected edges 1 could be welded to a flange or deck plate P with complete fusion welds, since the weld could be deposited from both sides, access to the inner side being made through the serration openings 5 located directly opposite each edge 1, as indicated in the partial elevational view in FIG. 9b. These serration openings also serve as access holes for inspection and maintenance of interior surfaces of those closed- or boxed-body stiffeners.

Aside from their use as stiffeners, these angle- and channel-shaped members could be covered on their open side by the basic serrated plate A to provide two new structural shapes of great aesthetic appeal, as depicted in top, side and end views in FIGS. 10, 10a, 10b and FIGS. 11, 11a, and 11b. For proper fit at the connections, the length and spacing of serrated edges 1 are the same in both of the components. Here, again, the cross-sectional area of the composed member remains constant throughout its length.

Figure 12:
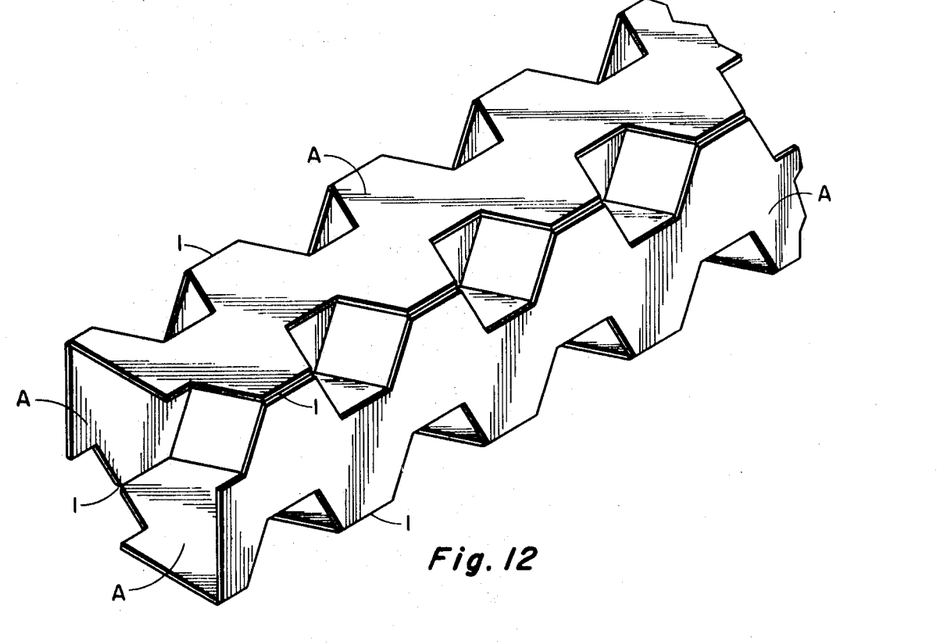
Figure 12A:
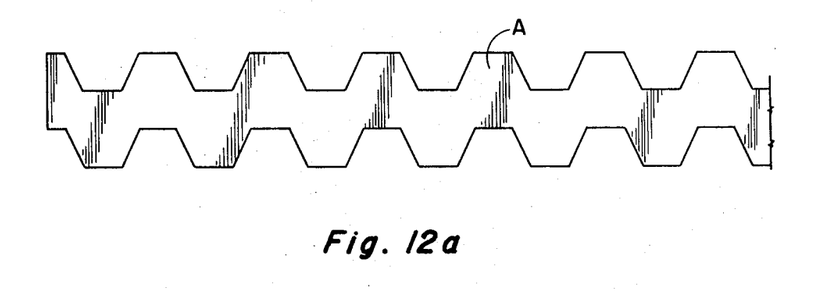
Figure 13:
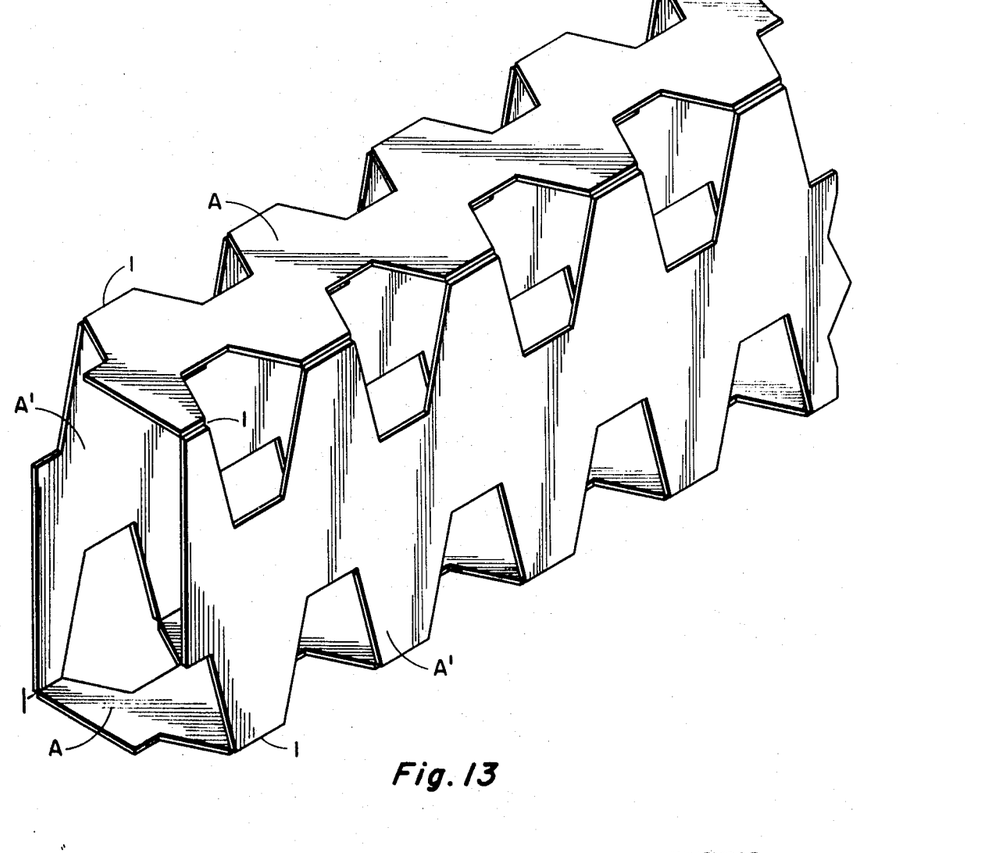
Figure 13A:
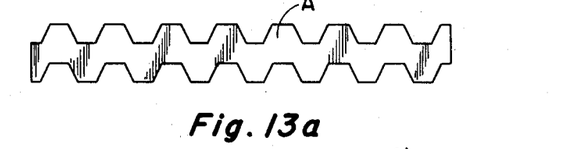
Figure 13B:
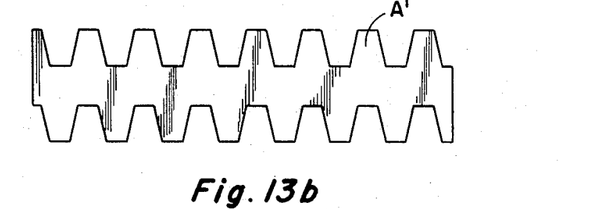

The basic element in its flat form can also be used to compose two other framing members. In one, use is made of four identical pieces A of FIG. 12a to build a four-sided member of square cross section shown in FIG. 12. In the other, two like pairs, A and A', shown in FIGS. 13a and 13b, compose a four-sided member of rectangular cross section shown in FIG. 13. Here the pairs A and A' differ only in the width $d$ of the unserrated part of the element.

Figures 14, 14A:
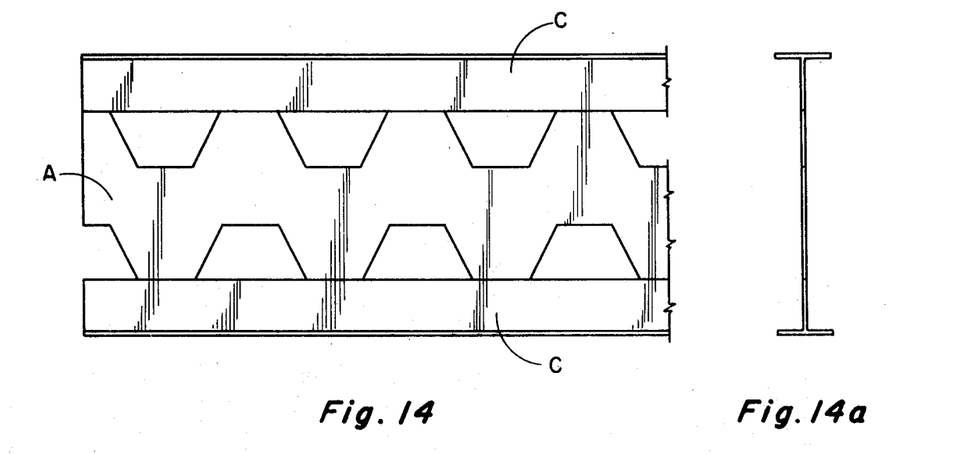
Figures 15, 15A:
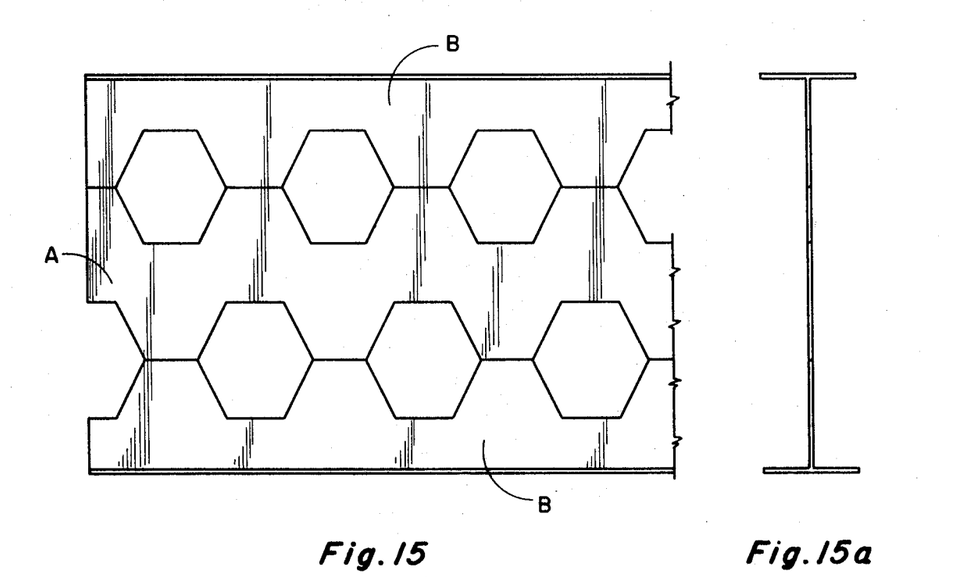

Still two other novel framing members can be obtained by combining the basic element A with two conventional sections. In FIG. 14, a T-shaped piece C is added to each side of the basic element A to form an I-shaped member, shown in cross-sectional view in FIG. 14a, in which the former serves as top and bottom flange and the latter as web. In FIG. 15, a serrated-stem T-shaped piece B is used for flanges with element A as web to obtain an I-shaped member of greater depth, of which FIG. 15a is a cross-sectional view. The flanges may also consist of unserrated plates, angles, channels, and other structural shapes.

It is to be noted that, as in other configurations, the cross-sectional areas of the members shown in FIGS. 14 and 15 remain constant through the length of each member.

Figures 16, 17:
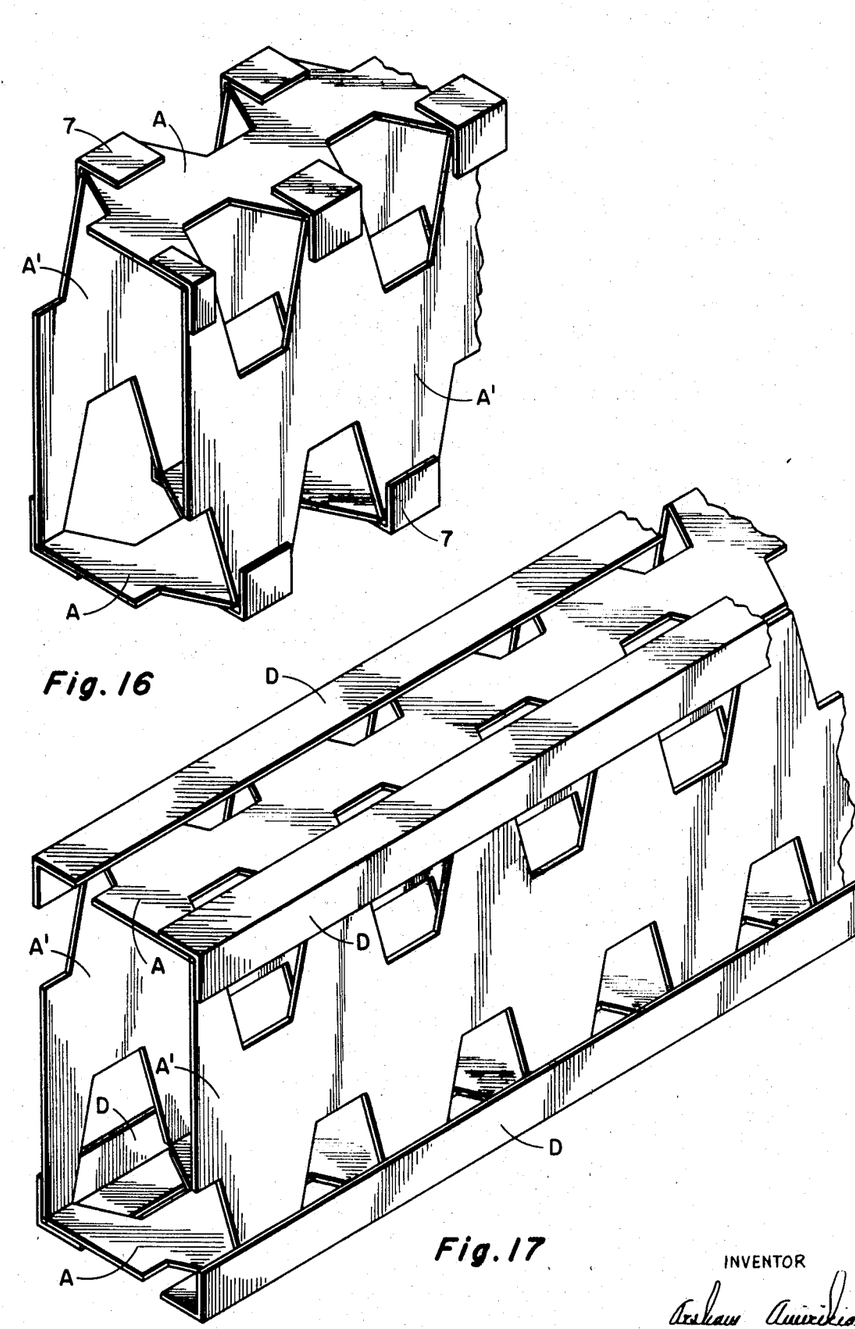

Interconnection of the component elements to form members of various shapes may be accomplished by several ways according to the type of the composing material. For metal, abutting edges 1, as in FIGS. 10, 11, 12 and 13, may be joined by welding, or connected together by means of bolted clips 7, shown in FIG. 16, or continuous angle shapes D, shown in FIG. 17. For plywood and plastics, connections may be made directly by adhesives, or through corner connection blocks and fasteners. In the case of concrete, steel insert plates may be cast in the outer edges of the basic element which then could be joined by welding.

Framing members built in accordance with this invention when incorporated in structures as beams, girders, columns, struts, bracings and other components would result in not only economical but also very pleasing arrangements.

While I have described the most important applications of the basic element, there are many other possible forms of lesser merit which may be obtained as variations. One such variation is obtainable by bending the element A into an angle of 90 degrees, with the bend line either coinciding with the longitudinal axis of the element or paralleling it at some distance. Four of such angle sections could then be put together to form a four-sided member of square or rectangular cross sections. The joining of the edges, which would now be located at or near the center line of each face, could be accomplished by butt-welded, lap-welded, or bolted connection.

Figure 18:
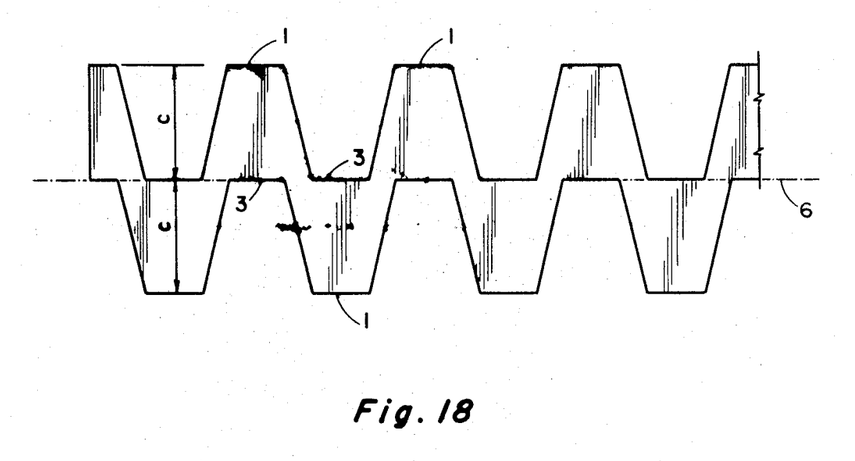
Figure 19:
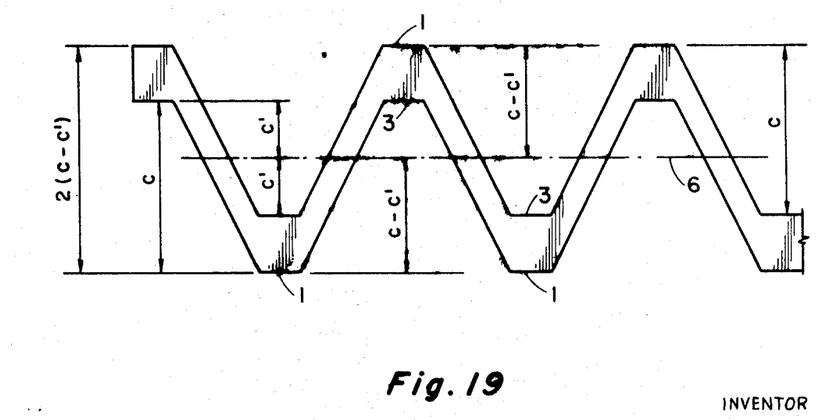

Still another variation may occur in the basic element A. In all prior illustrations, the element contains a solid part $d$, located between the inner serrated edges 3. In certain uses, one may want to extend the serration to the longitudinal axis 6 of the element, as sketched in FIG. 18, or carry them beyond the longitudinal axis, as indicated in FIG. 19. As will be noted, in the former illustration, the distance $d$ becomes zero, and the over-all width equals $2c$; and in the latter, the serrations on opposite sides overlap by an amount $2c$, and the over-all width equal $2(c-c')$.

Having thus described my invention, I claim.

1. A structural framing element adapted for use as a web segment in build-up beams, girders, columns and the like comprising:
   (A) a flat longitudinally elongated rectangular plate having parallel planar longitudinal side faces and parallel longitudinal side edge boundaries;
   (B) a plurality of serrations in said plate extending inwardly from each said side edge boundary, in respective serration patterns wherein:
      (i) said serration patterns are identical, and geometrically opposite and opposed, with the serrations along respective edges being displaced one serration with respect to one another;
      (ii) said serrations in said patterns including mutually parallel and directly opposite pairs of equal length straight edge segments alternating in direction, parallel and inclined to the longitudinal axis of said plate with the inclined segments having reverse slopes in successive pairs, said segments terminating and being joined at apexes in sharp angles; and
      (iii) distances between the opposite side edge portions measured normal to the longitudinal axis of said plate being constant throughout the length of said plate.

References Cited

UNITED STATES PATENTS

| | | | |
|---|---|---|---|
| 1,758,903 | 5/1930 | Willetts | 52—589 |
| 2,990,038 | 6/1961 | Diamond | 52—636 |
| 3,263,387 | 8/1966 | Simpson | 52—729 |
| 3,283,464 | 11/1966 | Litzka | 52—729 |

FOREIGN PATENTS

| | | | |
|---|---|---|---|
| 107,077 | 1938 | Australia | 287—189.36 B |
| 498,281 | 1/1939 | Great Britain | 52—636 |

THOMAS F. CALLAGHAN, Primary Examiner

W. L. SHEDD, Assistant Examiner

U.S. Cl. X.R.

52—690, 731; 287—189.36 R